(12) United States Patent
Goldman

(10) Patent No.: US 8,788,541 B1
(45) Date of Patent: Jul. 22, 2014

(54) INFORMATION SERVICE WITH CONNECTIVITY BETWEEN ENTITIES

(75) Inventor: Neal Goldman, New York, NY (US)

(73) Assignee: Relationship Science LLC, New York, NY (US)

( * ) Notice: Subject to any disclaimer, the term of this patent is extended or adjusted under 35 U.S.C. 154(b) by 187 days.

(21) Appl. No.: 13/225,377

(22) Filed: Sep. 2, 2011

Related U.S. Application Data

(60) Provisional application No. 61/507,106, filed on Jul. 12, 2011.

(51) Int. Cl.
*G06F 17/30* (2006.01)
*G06Q 10/10* (2012.01)

(52) U.S. Cl.
CPC .................. *G06F 17/30864* (2013.01)
USPC .......................... 707/802; 705/319

(58) Field of Classification Search
None
See application file for complete search history.

(56) References Cited

U.S. PATENT DOCUMENTS

| | | | |
|---|---|---|---|
| 8,185,558 B1 | 5/2012 | Narayanan et al. | |
| 8,386,482 B2 * | 2/2013 | Gopalakrishnan | 707/732 |
| 2006/0020886 A1 * | 1/2006 | Agrawal et al. | 715/530 |
| 2006/0075335 A1 | 4/2006 | Gloor | |
| 2007/0124291 A1 | 5/2007 | Hassan et al. | |
| 2008/0071796 A1 | 3/2008 | Ghuneim et al. | |
| 2008/0086343 A1 | 4/2008 | Pendergraft et al. | |
| 2009/0228296 A1 | 9/2009 | Ismalon | |
| 2010/0082695 A1 | 4/2010 | Hardt | |
| 2010/0268719 A1 * | 10/2010 | Cormode et al. | 707/756 |
| 2010/0274815 A1 | 10/2010 | Vanasco | |
| 2011/0055186 A1 * | 3/2011 | Gopalakrishnan | 707/706 |
| 2012/0079023 A1 * | 3/2012 | Tejada-Gamero et al. | 709/204 |
| 2012/0166348 A1 | 6/2012 | Dyagilev et al. | |
| 2012/0317088 A1 * | 12/2012 | Pantel et al. | 707/706 |
| 2013/0019262 A1 * | 1/2013 | Bhatia et al. | 725/34 |

OTHER PUBLICATIONS

"Server definition," The Linux Information Project, created May 16, 2005, retrieved Jan. 23, 2013 from http://www.linfo.org/server.html, one page.

* cited by examiner

*Primary Examiner* — Tarek Chbouki
(74) *Attorney, Agent, or Firm* — Aka Chan LLP

(57) ABSTRACT

A system gathers information on important and influential people and builds a social graph. The social graph can be processed to determine the influence of a node in the graph or a subsection of the graph. For the influence in a subsection of the graph, only nodes with a specific type of relationship or concept is included in the influence calculation. For example, for the concept art, only relationships that have to do with art are included in the influence calculation (e.g., art collector and gallery owner).

20 Claims, 13 Drawing Sheets

Figure 14

INFORMATION SERVICE WITH CONNECTIVITY BETWEEN ENTITIES

CROSS-REFERENCE TO RELATED APPLICATIONS

This patent application claims the benefit of U.S. provisional patent application 61/507,106, filed Jul. 12, 2011, which is incorporated by reference along with all other references cited in this application.

BACKGROUND OF THE INVENTION

The present invention relates to the field of information management, and more specifically, to providing an information resource where the content is organized using a social graph.

In business, there is an adage: "the right ten minutes in front of the right person is worth more than a year at your desk." This is because it is people that make things happen, and connecting with the right person can give you the resources, access or credibility you may need to advance your business.

So, often the questions become who is the right person, how do I get in front of them, and how do I "emotionally connect" with them in the first few minutes so that they take a liking to me, listen to the rest of my presentation, and want to help me.

Most business people are constantly trying to advance their career by creating the "right" relationships. It is a complicated task figuring out who those people are, meeting them, and building a relationship. Each of these is a specific task.

Most executives try to "do their homework" in this regard. For instance: (1) I am going to a conference: who do I want to meet there and what should I say if I meet them? (2) I am going to a meeting: I know who the other people are going to be in attendance, but what can I know about them to make my meeting more successful? (3) I want to meet someone: who do I know who can introduce me? (4) I want to get someone as a client: how do I sound knowledgeable about their particular lives and issues to demonstrate sensitivity to their concerns? There are many more such use cases.

Some social networks include Facebook™ and LinkedIn™. Trademarks indicated in this patent application are the property of their respective owners. If the world is a pyramid of people, with the "most important" being at the top, Facebook is the masses at the bottom and LinkedIn is the middle-level managers in the middle. However, there is no social network that caters to the world's most "influential people," in large part because these people generally keep a low profile, do not promote themselves, and generally do not want the general public contacting through electronic means.

On-line services, libraries, and information resources are available to assist users to research people (often important and influential) that they want to make a connection to. The information is, however, typically presented in a flat format. Even if hyperlinked, the information is still not presented in a way to easily show connections between a targeted individual and other people, and how the targeted individual might be connected to the user.

Therefore, there is a need to provide an information resource where information is also organized according to a social graph or social network, which shows the connections between people, especially influential people.

BRIEF SUMMARY OF THE INVENTION

A system gathers information on important and influential people and builds a social graph. The information is organized based on this social graph and provided to users as a service. The system has an ontology and analytics to organize the people according to their overall power or influence (which can be called a influence index value) as well as their influence in a particular domain, relationships to other people or organizations, influence over others, indirect influences, and more. Users can enter as nodes in the social graph to explore potential relationships and commonalities with the influential people. Connectivity information in the social graph and databases are continually updated as new news and information becomes available. Users can request and receive reports on people of interest as information is updated.

The system creates an extensive database and technology product that tracks the most important or influential people in the United States and in the world. There are an estimated one and a half million very important and influential people in the U.S. and the world, and the system can track these people and more. The system is scalable to track increasing numbers of people as and also people in additional geographic areas.

In an implementation, the system is not a social network like Facebook or MySpace. Users or subscribers of the system are not asked to contribute any data, but the users can provide information about themselves so the system can determine any links they might have to the people being tracked. The system uses a vast array of publicly available data sources, both on-line and not on-line, to create deep and rich profiles on people—their business life, their personal life and who they know. This is not just who these people know in a business context, but who are their friends and others who have "real world" influence over them (and vice versa).

In additional to "important" people, there are some very key hubs of connectivity and influence. For instance, a well-respected divorce attorney who has developed very close relationships with his or her clients over the years, can potentially be a powerful connector in society. The information on who they know can be valuable to a user. In another example, relationships of a respected person running a well-respected nonprofit is tracked. This person may know large donors (who themselves are very important) to the nonprofit.

Additionally, the system allows subscribers (such as people who pay a monthly fee to access to the system through the Internet) to create their own profile. The system can include for example, where they went to school, where they worked, what types of nonprofit interests they have, clubs they belong to, where they grew up, and who they know. In an implementation, this profile is not seen by any other user or subscriber of the system. The profile may be protected and not shown to others unless explicitly granted permission, but allows the system to customize itself to the user. So, if a subscriber pulled up the profile of an important person they would immediately see "who do I know in common with this person" and "what other interests or facts do I share in common with this person." In essence, the system can do the work of telling a user how to get to anyone and what to say to them to bond with the person within a few minutes. There are many applications for the system and some examples are described below.

Most executives do some version of this work already. They do Google searches (or have their assistant do it), which returns a very verbose, spotty, incomplete, and unsynthesized view of a person. Then, they have to read it all to try and understand how they might relate to the person. This costs time and money and is very inefficient. The system makes this information available more easily.

In an implementation, a method includes crawling a network of unstructured information data sources to obtain first information; filtering the first information to obtain second information; storing the second information on a server; building a social graph using the second information, where the social graph includes system-provided nodes and system-provided edges that link the nodes, and a node is at one or more degrees of separation from other nodes; and providing a graphical user interface through which users can access third information stored in the social graph.

In various implementations, the social graph is stored in a database stored on the server. The graphical user interface is provided through a Web browser executing on a client device such as a desktop computer, laptop, smartphone, or tablet.

The method can include allowing users to input fourth information via the graphical user interface; creating user ghost nodes and user ghost edges using the fourth information, where the user ghost edges connect the user ghost nodes to system-provided nodes; and through the graphical user interface, displaying connections between a first user ghost nodes through first user ghost edges to at least one system provided node. The first user ghost node has two degrees of separation from a first system-provided node by passing through at least one first user ghost edge and at least one system-provided edge.

The method can include performing analytics on the social graph including ranking the system-related nodes in relation to each other, where the ranking indicates an influence of a first system-related node to a second system-related node. The method can include updating the social graph by using the second information to supplement information associated with an existing system-provided node.

In another implementation, a method includes crawling a network of data sources to obtain information; organizing at least a portion of the information in a social graph structure including system-provided nodes and system-provided edges interconnecting the nodes, where each node includes information on a person or organization; providing a user interface through which users can access information on people or organizations stored in the social graph structure; and providing a first user screen where a user can view information on a first person, stored at a selected system-provided node, and references to first-connected people associated with the first person by one degree of separation in the social graph structure, where the first-connected people are stored at system-provided nodes connected by at most one system-provided edge to the selected system-provided node.

In various implementations, the method can include providing a second user screen where users can view references to second-connected people associated with the first person by two degrees of separation in the social graph structure, where the second-connected people are stored at system-provided nodes connected through at most two system-provided edges to the selected system-provided node.

The organizing at least a portion of the information in a social graph structure can include: storing a first piece of the information in a first system-provided node of the social graph structure; storing a second piece of the information in a second system-provided node; and using a third piece of the information to form an first system-provided edge to connect the first and second system-provided nodes.

In another implementation, a method includes: providing a social graph including system-provided nodes and system-provided edges between system-provided nodes; receiving first information obtained through a network; filtering the first information to identify second information relevant to at least one system node or edge of the social graph; adding at least a portion of the second information to at least one system-provided node or edge of the social graph; by one or more computers, allowing users to become members of an information resource system including the social graph; after a first user becomes a member, inserting the first user into the social graph as a first user ghost node and connecting the first user ghost node to at least a first system-provided node through a first user ghost edge; and allowing the first user to access the first system-provided node and other system-provided nodes of the social graph.

In various implementations, the method can include: after a second user becomes a member, inserting the second user into the social graph as a second user ghost node and connecting the second user ghost node to at least the first system-provided node through a second user ghost edge; and allowing the second user to access the first system-provided node and other system-provided nodes of the social graph, but not allowing the second user view or access the first user ghost node. The first user may not be allowed to view the second user ghost node.

The method can include: after a first user becomes a member, receiving first input from the first user; and based on the first input, determining a connection to the first system provided node through the first user ghost edge. The method can include: after a first user becomes a member, receiving second input from the first user; and based on the second input, determining a connection between the first user ghost node to a second system-provided node through a second user ghost edge, where the first system-provided node is not directly connected to the second system-provided node through a system-provided edge.

Based on the second information, a first system-provided edge can be added to the first system-provided node including the second information. The first user a list of second system-provided nodes is displayed that are at a first degree of separation from the first system-provided node. Displayed to the first user is a list of second system-provided nodes that are within a second degree of separation from the first system-provided node. The first user to permitted to indicate (such as through the user interface) a number of degrees of separation greater than one for displaying system-provided nodes connected to the first system-provided node. In an implementation, the network is the Internet and sources of the first information obtained from the Internet are unstructured (or otherwise not organized in a social graph format).

Other objects, features, and advantages of the invention will become apparent upon consideration of the following detailed description and the accompanying drawings, in which like reference designations represent like features throughout the figures.

BRIEF DESCRIPTION OF THE DRAWINGS

FIG. 14 shows an information page for a target organization including showing people the user knows at the target organization.

DETAILED DESCRIPTION OF THE INVENTION

Figure 1:
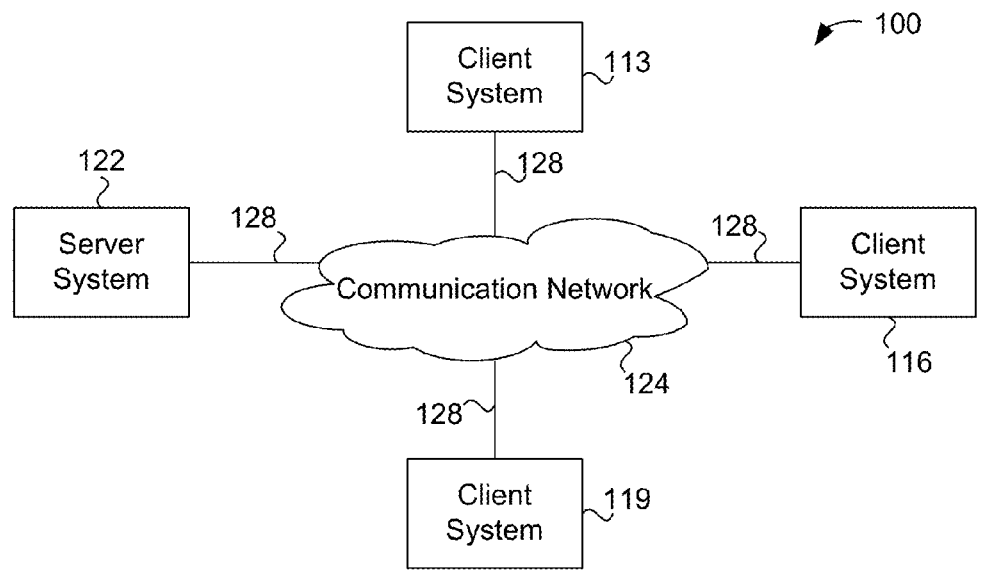
FIG. 1 shows a simplified block diagram of a distributed computer network within which a system of the invention can be implemented.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like. Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, Chrome by Google Inc., WebKit and its variants, or others.

Figure 2:
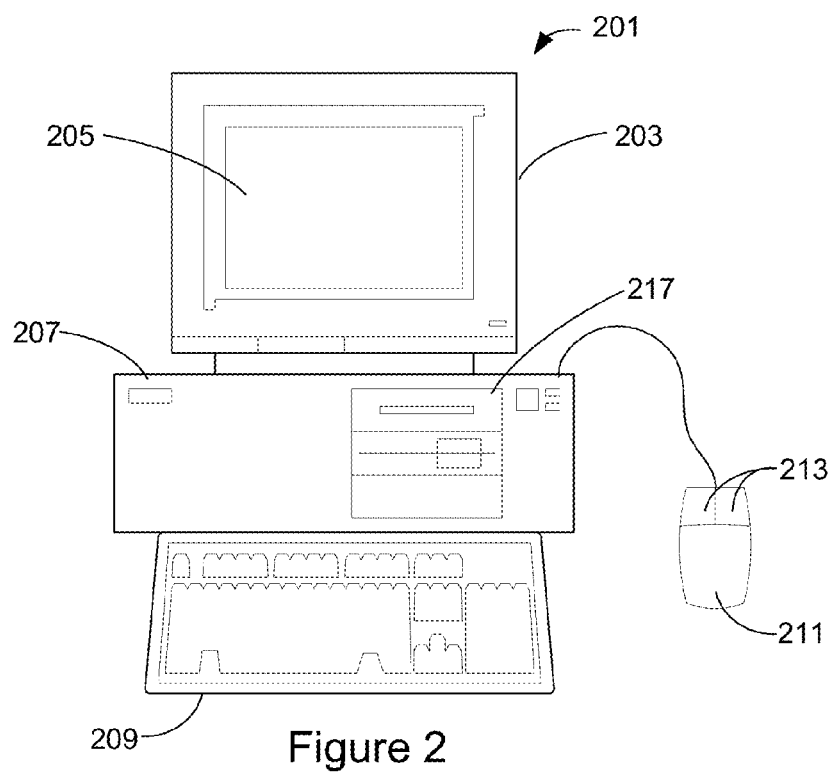
FIG. 2 shows a more detailed diagram of a computer system, client or server, which is used operate with the system.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

The computer system in FIG. 2 is representative of electronic computing systems with a computer processor or central processing unit (CPU). These include servers, desktop computers, workstations, notebook or laptop computers, tablets, nettops, netbooks, smartphones, set-top boxes, media players, and many others. These can also include iPads, iPhones, PDAs, or Android phones.

Figure 3:
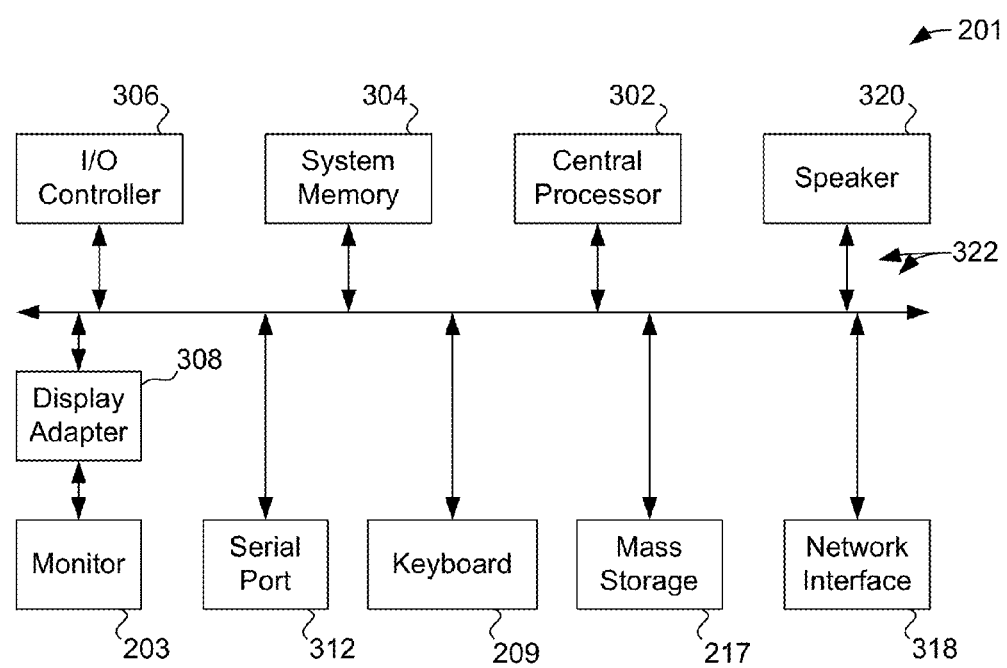
FIG. 3 shows a system block diagram of a computer system used to execute a software implementation of the invention.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, Microsoft Xbox 360 central processing unit (CPU), and ARM architecture based processors (e.g., Nvida Tegra2, Qualcomm Snapdragon, Apple A4).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, SQL, dBase, Gremlin, Blueprints, Python, PHP, or Closure. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows Vista, Windows 7, Windows 8, Windows CE), Linux, UNIX, Sun OS, Ubuntu, or Macintosh OS X. Microsoft Windows is a trademark of Microsoft Corporation. Some mobile operating systems that can be used with an implementation of the invention include: Google Android, Chrome OS; Apple iOS4 or iOS5; Blackberry OS; Windows Phone 7.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). Other information transmission standards that can be used in a system of the invention include: Bluetooth, wireless USB, WiMAX, EDGE, EV-DO, GPRS, HSPA, LTE, UMTS, Edge, 2G, 4G, LTE. For example, signals from a computer may be transferred, at least in part, wirelessly to components or other computers.

The system maps the world of influence through a large database, which can be stored in a variety of ways. A specific technique is through a combination of an entity graph and associated SQL database, but other database types may be used. The database is at its core a mapping of entities and relationships between those entities. Note that this can be done with an array of other technologies, all of which can be used to achieve the same result. A technique and implementation of the system scales nearly infinitely to handle all the real-world ways that people know each other and facts about them.

The system product allows the paid user or subscriber to step into the created world and see how they fit in. Moreover it provides them with information that allows them to move further in to this world of influence. The system can also be supported, in part or fully, by advertisements.

Note that the system captures certain types of relationship information (and many derivatives thereto) that have never been previously captured electronically. For example, there is no publicly available database in the world that has recorded who someone's best friend is. Or that two people were reported in page six of the news paper as having lunch together. Or what elementary school a particular executive sends his or her children, what grade they are in, what other powerful people have children in the same class, and which parents from that class donated the most money. In an implementation, the system can use the ontology, weighted path algorithms, and centrality algorithm to estimate the probability that two people know each other. The probability function is based on, amongst other things, how much influence these people have over one another, the difference of these two values, the sectors in which these two people have influence, and the influence they have in those sectors. In an implementation, given the default weight of a particular predicate, the probability is one-hundred percent that two people know each other. For example, if the relationship between person A and person B is "mother" the system determines that these two people know each other.

This idea of a person being "powerful" is to be described in more detail (e.g., see quantitative discussion below), but in a simple instance you can say President Barack Obama is the most important person in the world, and thus calculate every single person's importance by how well they know him and how many people removed they are (or how many people they know in common with him and how well). In practicality, several "sign posts" can be erected in each industry that allows for this type of sector power ranking to fall out. Also, this can be cut in a different way to show someone's overall power in the world (for instance).

In an implementation, a sign posts algorithm is used by human operators. These human operators can "bump up" a weight of a particular relationship, or entity in the graph. The system handles quantifying by way of an influence index the influence of one person over others or over a organization. The system handle quantifying an overall influence of a person, and also an influence values for a person in specific concepts or categories. For example, one person may have great influence in the English speaking world, but not so much influence in other places. A person may have great influence in a subject like anthropology, but much less influence in science. The system calculates multiple influence values for each person where those influence values are for specific concepts or categories.

In an implementation, the sign posts can alter the distribution of energy/influence in a graph based on a mathematical distribution (e.g., Bayesian distribution, Priors algorithm). Sign posts not only bias the centrality algorithm for influence amongst the entire graph, they can also be applied to effect centrality calculations for a particular domain.

Additionally, by means of the weighted path algorithm, the system can show how influential someone is over an organization, creative work, event, or a series of events. The system can calculate the weights between any two nodes in the graph, independent of their type. This can have to do with how closely they are (or have been) affiliated with an organization or entity, but can also be more nuanced. For instance, a person who is very close to three board members (but himself is not a board member) may be (or possibly could be) a key influencer of that organization. Influence is also transitive, for example: (1) CEO X controls Company Y, which in term owns a controlling stake in company Z; (2) X has transitive power over the CEO of company Z; and (3) CEO W controls company X, which in term owns a controlling stake in Company Y. We can determine that CEO of Company Y, CEO Z is very influenced by CEO W.

The system uses technology to collect this data, including pioneering innovative collection techniques (e.g., Internet, crawling, and filtering). Additionally, there can be a large team of people who "clean" this data. Given that the system is serving a very high-end clientele, the service needs to have very clean and precise data, which the human factor helps achieve.

U.S. patent application Ser. Nos. 13/224,110, 13/224,117, 13/224,119, 13/224,138, and 13/224,149, all filed Sep. 1, 2011, and 13/225,380, filed Sep. 2, 2011, are incorporated by reference along with all other references cited in this application.

Figure 4:
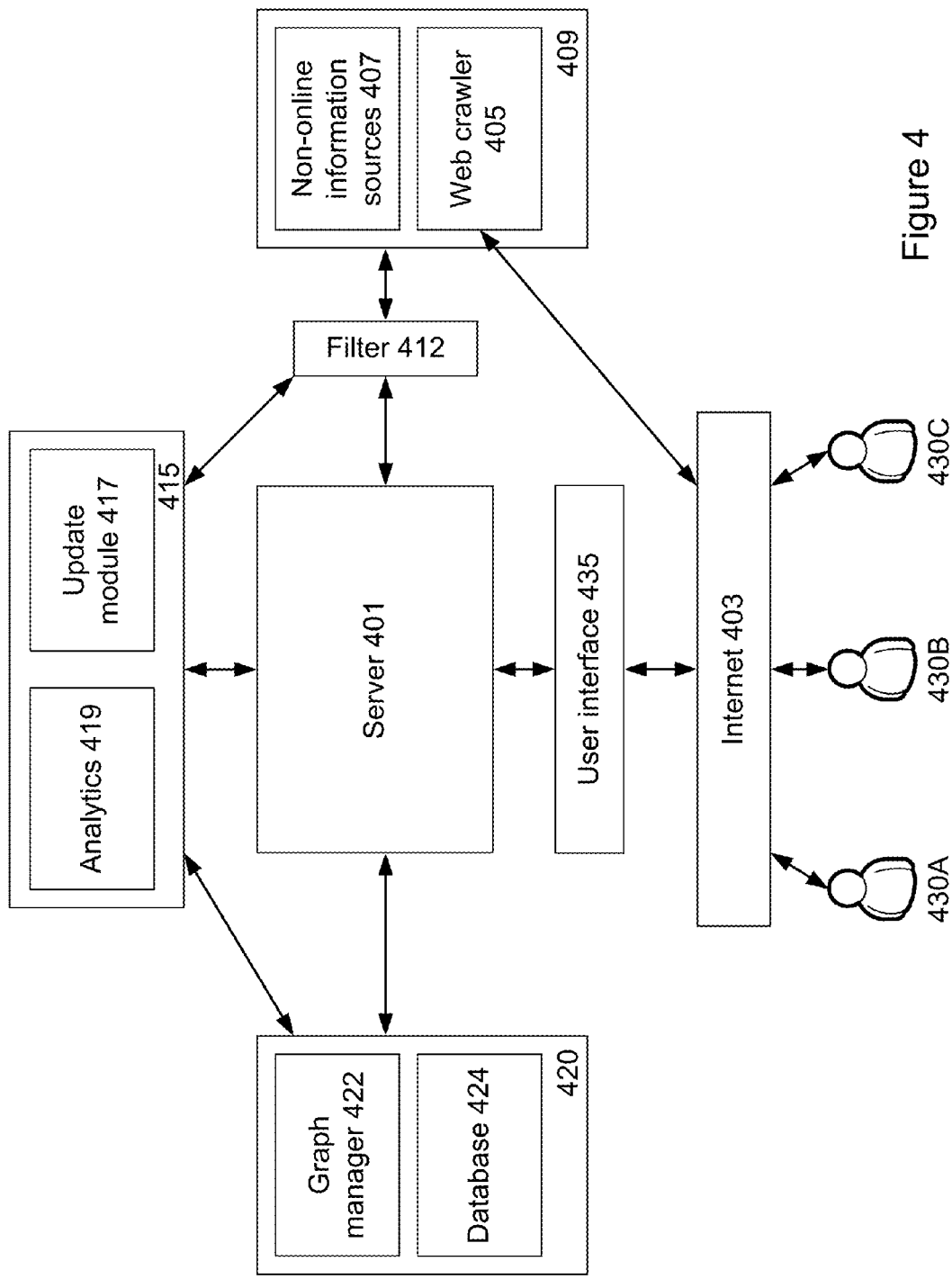
FIG. 4 shows a diagram of a system of the invention.

FIG. 4 shows a block diagram of an implementation of a system of the invention. The system gathers information on entities, people or organizations, from on-line and off-line sources. The information is organized using a social graph (having nodes and edges), so that social relationships between the information can be more easily determined. The system provides this information, organized by social graph, as an information resource service to users. Users can use the system as a tool to identify and make better connections to other people or organizations.

In an implementation, a server 401, having hardware such as described above, executes and stores software and data of the system. The server receives information from an information gathering module 409, which can be take information from on-line or non-on-line (or off-line) sources, or both.

For on-line sources, a crawler module can be used. Via the Internet 403, a crawler module 405 (e.g., Web crawler) gathers information for the system from on-line source and sends the collected information to the server. These on-line sources include Web pages and other unstructured information data sources.

The crawler module is a computer program that browses a network such as the Web or Internet in a methodical, automated manner in orderly fashion to gather desired information. The crawler can be embodied as ants, automatic indexers, Web crawlers, Web spiders, or Web robots. The sites the crawler retrieves information from can include public and closed sources. Some examples of closed sources include membership, closed-networks, and pay information services such as LexisNexis®, which is a registered trademark of LexisNexis.

In addition to the crawler module, a team of individuals can also assist or otherwise work in combination with the automated process. For example, the team can review and refine the results of the crawler. And the team can identify information available on-line that is not found through the automated process (which may be due some links or URLs that are not reachable in an automated way).

For off-line sources 407, a research team can find relevant information and then put the information into electronic form for further handling by the system. Such off-line sources can include print (e.g., yellow pages, white pages, school yearbooks, old papers records that have not been put into electronic form) and other sources which are not available on-line. Some of these sources may be newspapers from countries other than the U.S. that do not have an on-line counterpart. Therefore, some of these sources may not be in English, and will be translated as needed (either by a translator (person) or by way of a machine translation) into English for inclusion into the system.

In an implementation, the information gathered (whether on-line or not on-line) is related to an entity, specific person or organization. The person or organization is one that the system tracks for its users. For example, the information may include all activities and news related to the specific person being tracked. These may include news about the person, stock purchases and sales, appearances at events, relationships with others, lawsuits, travel, identification of family members, new family members, contributions or donations to organizations, promotions, demotions, company changes, retirement, and others.

This information from information gathering module 409 is filtered by a filter module 412. The filter module 412 "cleans" the information by identifying the information relevant to the system, and discarding (e.g., removing or redacting) information that is not relevant or is of low relevance to the system. The filtering module may present a report of the proposed filtering to a person for approval or modification before being published live on the system.

After filtering, the information is transferred to an information processing block 415, which includes an update module 417 and analytics module 419. Update module 417 handles determining whether information in the system should be updated, since some of the information may be duplicative or not current. For information to be added to the system, the update module will handle performing updates (or request another module to do the update).

In the case the information is for a person already having a node in the social graph managed by the system, that node is updated. This node is a system-provided node because it is generated by the system, and not one which was created for or by a user or member of the system.

In the case the information is for a person that does not yet have a node, the update module will create the node (as a system-provided node) and create edges for the node as appropriate to link the new node to other system-provided nodes. Edges created by the system between the system-provided nodes are referred to as system-created edges.

The system provides information on individuals and organization. This information can be presented like a biography or dossier format. Some screen shots of pages are in FIGS. 13 and 14. The dossier portion of the information can be stored in a database or multiple databases, or other data structures (e.g., arrays). The system also maintains the relationships of the a people and organizations. These relationships are stored in the social graph, and the social graph is related to the other data structure (e.g., database) where the dossier information is stored.

Typically, the crawler module continually searches on-line sources for new information. It is desirable that an updates occur in real-time or soon as practicable, so that the information service offers timely information for its users or customers (e.g., 430A, 430B, and 430C). For any new information found, the update module updates the social graph and databases of the system. The social graph is updated to reflected new or changed relationships for people in the social graph. The database is updated to reflect new biographical or dossier information on people.

The analytics module 419 performs analytics on the information of the system, such as calculating influence index values for each node and other metrics based on the social graph. The analytics modules uses algorithms, and the resulting metrics (e.g., influence or power ranking) can be continually update as the nodes are updated. For example, analytics include calculating or updating a influence index value (or power ranking) for a person. Analytics is described further in U.S. provisional patent application 61/507,106, filed Jul. 12, 2011, which is incorporated by reference.

Another feature of the system is to allow users to set-up watches on people being tracked by the system. Then when users log into the system, their home page will show updates and new news on the watched people since they last time they logged in. E-mail or other messages (e.g., SMS) can be sent to the users to alert users of new news for the watched people.

The system stores information, including the social graph, in a storage block 420. This storage block may be implemented using hard drives of the server or across multiple servers (or network-attached storage (NAS) drives). Storage module 420 includes a graph manager 422 and a database 424 module.

The graph manager module manages the social graph of the system, adding, modifying, updating, or deleting information, nodes, and edges of the system. The social graph can be stored in a database structure. Each entry in the database can represent a node and include links, representing edges, to other entries or nodes. Other computer data structures can be used to implement a social graph of the system, including queues, stacks, pointers, arrays, linked lists, singly linked lists, doubly linked lists, and others, in any combination.

As example of graph manager operation, if a graph contains information about a person A who is the chief executive officer (CEO) for a company A, but person A has resigned to become CEO for company B, the graph manager will update the person A's system-provided node to reflect the new relationships to people of company B. Further, the information or dossier about person A in the database (which can be referred to as a dossier database) can be updated to reflect the change in position (e.g., list when the change occurred). The system stores its information in the dossier database and social graph, which can be access by the users of the system to see the updates.

The information of the system is provided as a service to users or subscribers 430A, 430B, and 430C. The users can pay a periodic charge (e.g., month, yearly, or other time period). The users can pay per use (e.g., a charge per search). The users can use the system for free, where the system is, e.g., ad supported or supported by revenue from other sources besides user fees. The system can have also have modules (not shown) for generating revenue by any one or combination of these revenue models.

In an implementation, the system has a Web interface so users can access the system via an Web browser at a client device. The client may be a mobile device such as a smartphone or tablet computer. Depending on what type of device the user 430A-430C is using, the user interface module 435 prepares and transmits a version (e.g., HTML or XML) suitable to the user's device. Also, the user interface module 435 prepares and selects what information to present. The system may have other interfaces, which can be used instead of or in combination with the Web interface, such as a dedicated application or app to connect to the service.

As discussed, the system organizes information about people or organizations using a social graph. By organizing information using a social graph, this can make it easier for viewers who access the information to determine the relationships and connections between the people (nodes) in the social graph. Using the social graph structure, a user can determine the degrees of separation between the nodes in the graph. A node can have any number of degrees of separation, one, two, three, four, five, six, seven, eight, nine, ten, or more. Generally, the more degrees of a separation one node is from another, the less strong the relationship is between those two nodes which represent two people. For example, the user can specify in a search term a number of degrees of separation in which to limit the search (e.g., search for two degrees or less) from a particular person, so that less strong connections can be omitted from the search results.

For a social graph, one degree of separation between two nodes means that the two nodes are connected via a single edge. Two degrees of separation between two nodes means that the two nodes are connected via two edges (passing through another node). Three degrees of separation between two nodes means that the two nodes are connected via three edges (passing through two other node). Therefore, n degrees of separation between two nodes means that the two nodes are connected via n edges (passing through n−1 other nodes).

Compared to, e.g., an HTML page or other data structure giving information on an individual, the social graph structure gives additional relationship information, which is very valuable in the context of a person trying to make relationship connections. With a social graph structure, an information page for a person of interest (person A), the user can see the people connected by a first-degree connection to person A. The person can connect via a link on person A's page to see another person, person B, who has a one-degree connection to person A. On the page for person B, the user will see all the one-degree connected people to person B, which includes person A.

With an HTML page, the relationship information is not inherent in the HTML structure. In fact, once one follows a link from one HTML page to another, the next HTML does not necessarily include a link back to the referring page. Information is lost when traversing from page to page. A social graph structure does not have this problem.

Although there can be any number of degrees of separation in a social graph, the system can allow the user to configure searches, calculations, and other operations to limit the numbers of degree of separate to a certain value m, an integer 1 or greater. By limiting the m, this can increase the speed of the system, since less information or nodes need to be considered. The user may want to leverage stronger relationships first, and such a user-configurable setting allows this.

As a further aspect of the system, after a user signs up and becomes a member or customer of the system. The system creates a node for the user, which is a ghost node in the system graph. This is in contrast to a system-provided node which is a node created by the system. Ghost nodes of the system are created for users of the system. Connections between ghost nodes and other nodes (e.g., system-provided nodes) are through ghost edges. A ghost node and its ghost edges is visible only to the user, and not others users of the system.

For the ghost node, the system allows the user to input information on the user. For example, this information can include people the users know, activities the user participates in, education of the user, and other information about the user. This user-input information can help the system identify connections, in conjunction with information in the dossier database, to the system-provided nodes (people and organizations, or entities, being tracked by the system) in the graph. The user input can relate to information not being tracked in the social graph, and the system can intelligently determine potential relationships user input and dossier database.

The user can then tag people the user knows, organizations the user is affiliated with, and things the user likes. The more relationships the user adds the more they become plugged into the sphere of influence. Given the information provided by the user, the application runs weighted path algorithms in order to show the user to whom they are connected and how.

The system does not allow the activity of this ghost node to effect the way information is generated for other users. Since the information added by the user is applicable to that one person, this node is treated as a "ghost node." Any calculation that hits this part of the graph for any other user, realizes this is a ghost node, and the traversal at that part of the graph dies.

So, the system allows a person to enter ("virtually") into the graph for the user's own use, morphing and defining it for the user's own purpose without impacting other users, or the general makeup of the system's data. The ghost node will not interact or interfere with other ghost nodes for other users of the system.

Figure 5:
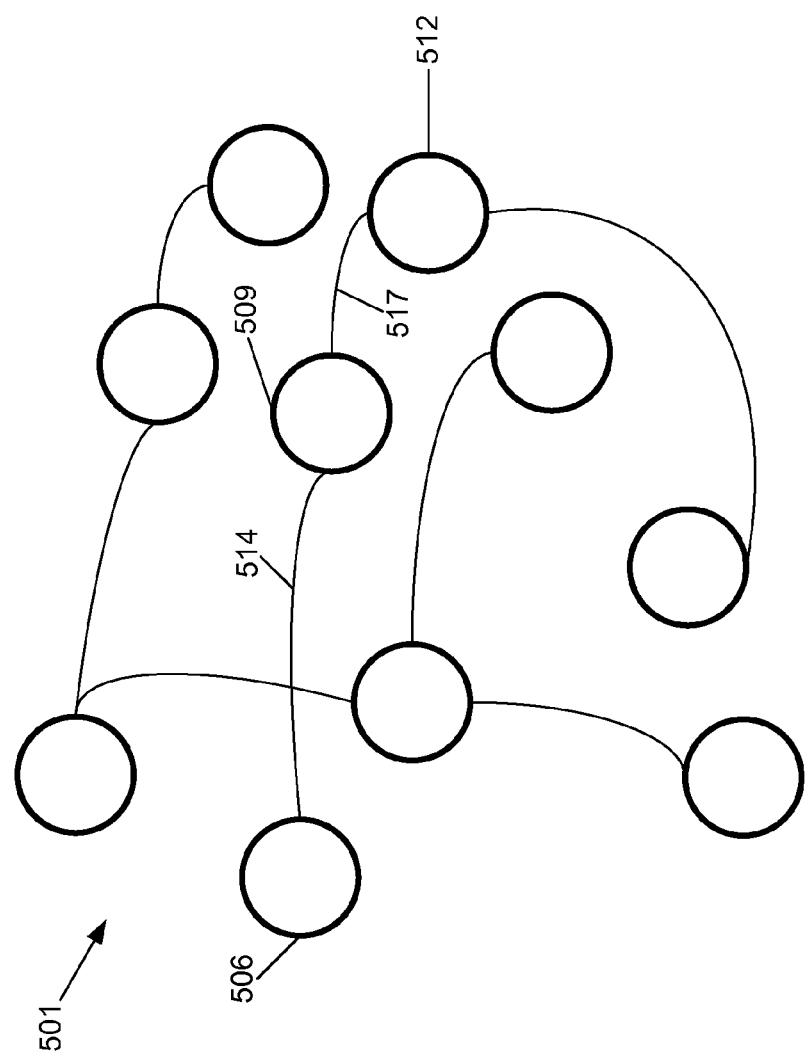
FIG. 5 shows a social graph with system-provided nodes connected by system-provided edges.

FIGS. 5-9 show a sample social graph of information for a system of the invention. FIG. 5 shows a sample master graph 501. This graph is maintained by graph manager 422 of the system. The nodes or circles (e.g., 506, 509, and 512) represent entities (people or organizations), and an edge or line (e.g., 514 and 517) between two nodes represent a connection between the two entities. In an implementation, the nodes can represent any entity (e.g., people, organizations, creative works, events, products, awards, places, or transactions).

Nodes 506, 509, and 512 are system-provided nodes. Node 506 has a one-degree connection through edge 514 to node 509. Node 506 has a two-degree connection through edges 514 and 517 to node 512. Node 509 has one-degree connections to both nodes 506 and 512, through edges 514 and 517.

Figure 6:
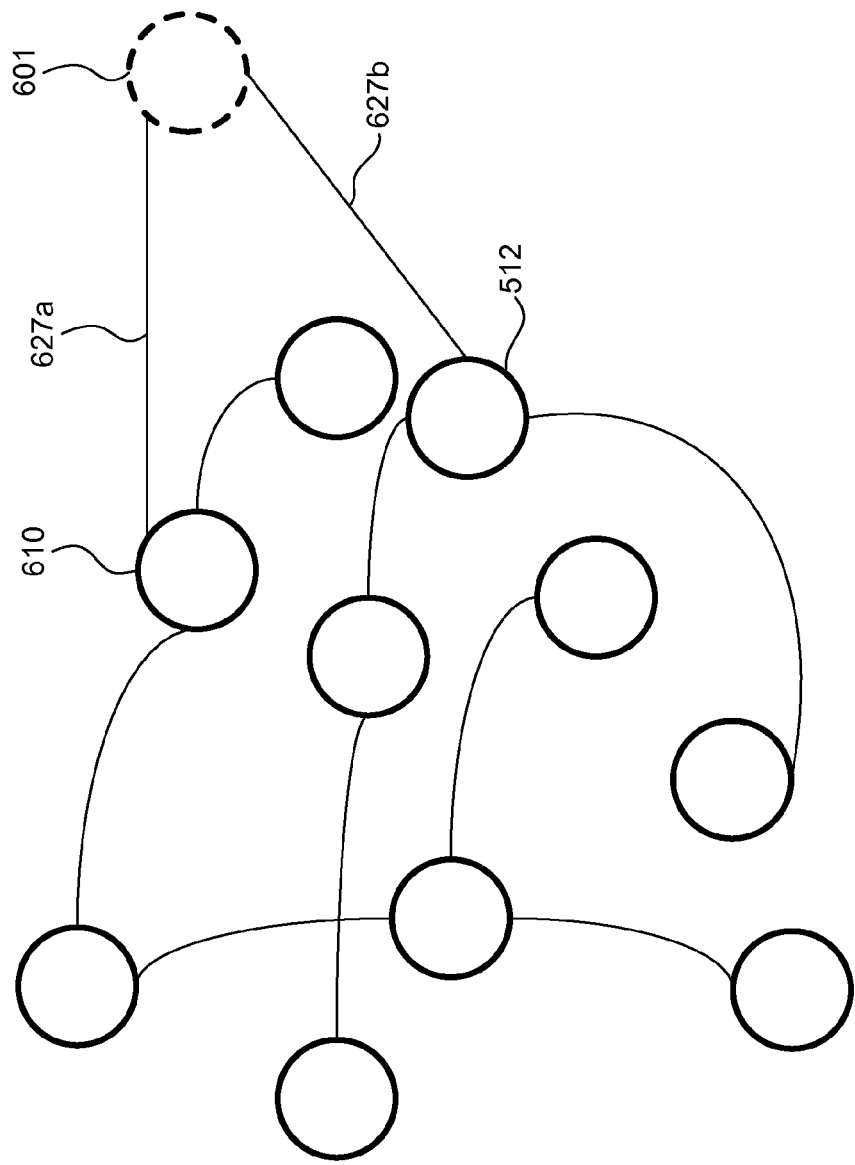
FIG. 6 shows the addition of a first user as a ghost node with ghost edges to the social graph.

FIG. 6 shows a first user being added as a ghost node 601 to graph 501. Node 601 is shown in broken lines. This first user 601 can be representative of a subscriber (e.g., ghost node) in the system, while the other nodes in solid lines are representative of a system-provided person or entity. The first user 601 adds information on connections they have in the system. For example, the first user in FIG. 6 is associated or affiliated with two persons 610 and 512 in the master graph, as represented by the two ghost edges 627a and 627b.

Figure 7:
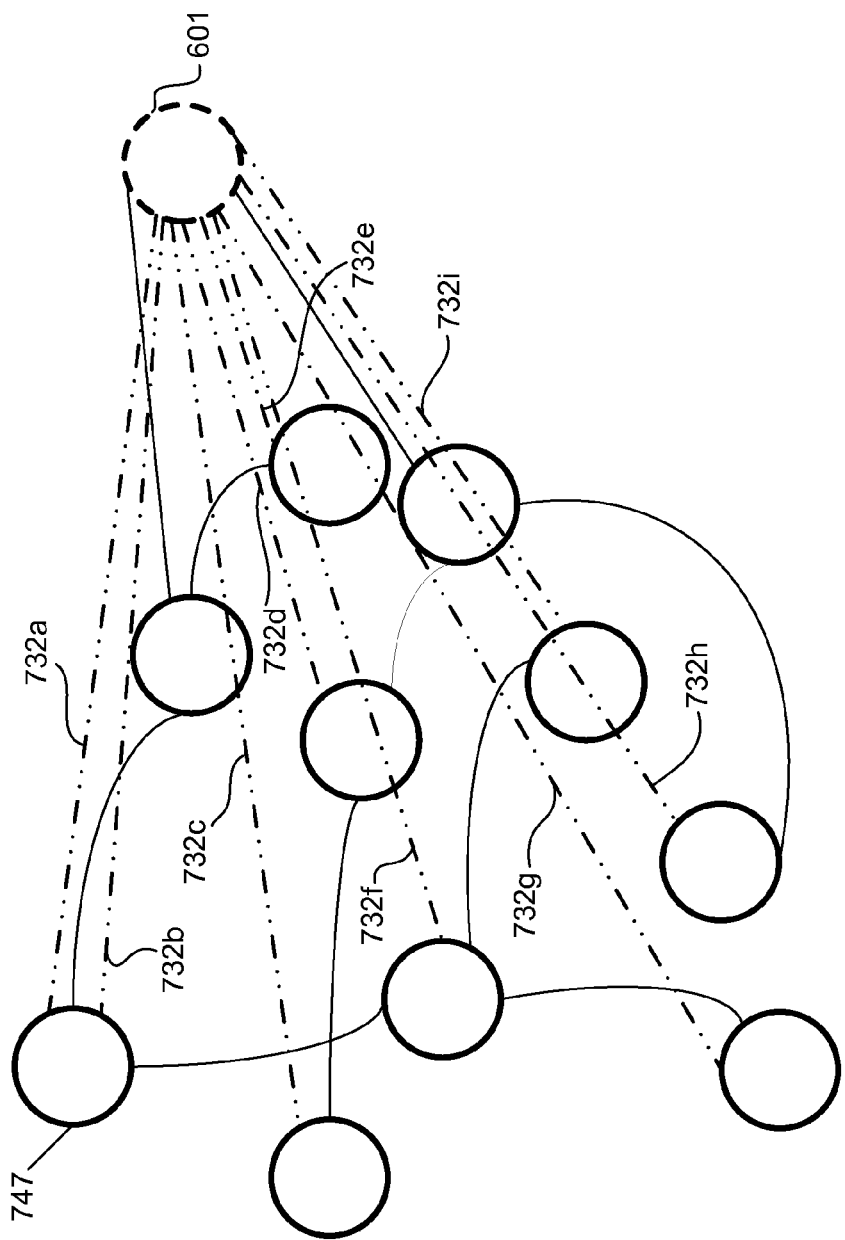
FIG. 7 shows connections the first user can make to system-provided nodes of the social graph.

FIG. 7 shows relationships ghost node 601 has with other nodes of graph 501. Node 601 has first-degree connections to nodes 610 and 512 (see FIG. 6). The relationships are represented by connections 732a-732i (not shown in FIG. 6) are of varying degrees of separation, greater than one. Node 601 has n degrees of separation with these nodes, where n is a number of edges (ghost edges and system-provided edges) that exist between the nodes to be traversed. For example, node 601 has a two-degree connection to a system-provided node 747, passing through one ghost edge and one system-provided edge.

Greater than one-degree connections are the connections that the first user does not have directly (e.g., first degree of separation or one step), but has through additional people or nodes. With the information in social graph from, the first user can trace how this connection or route is established.

Figure 8:
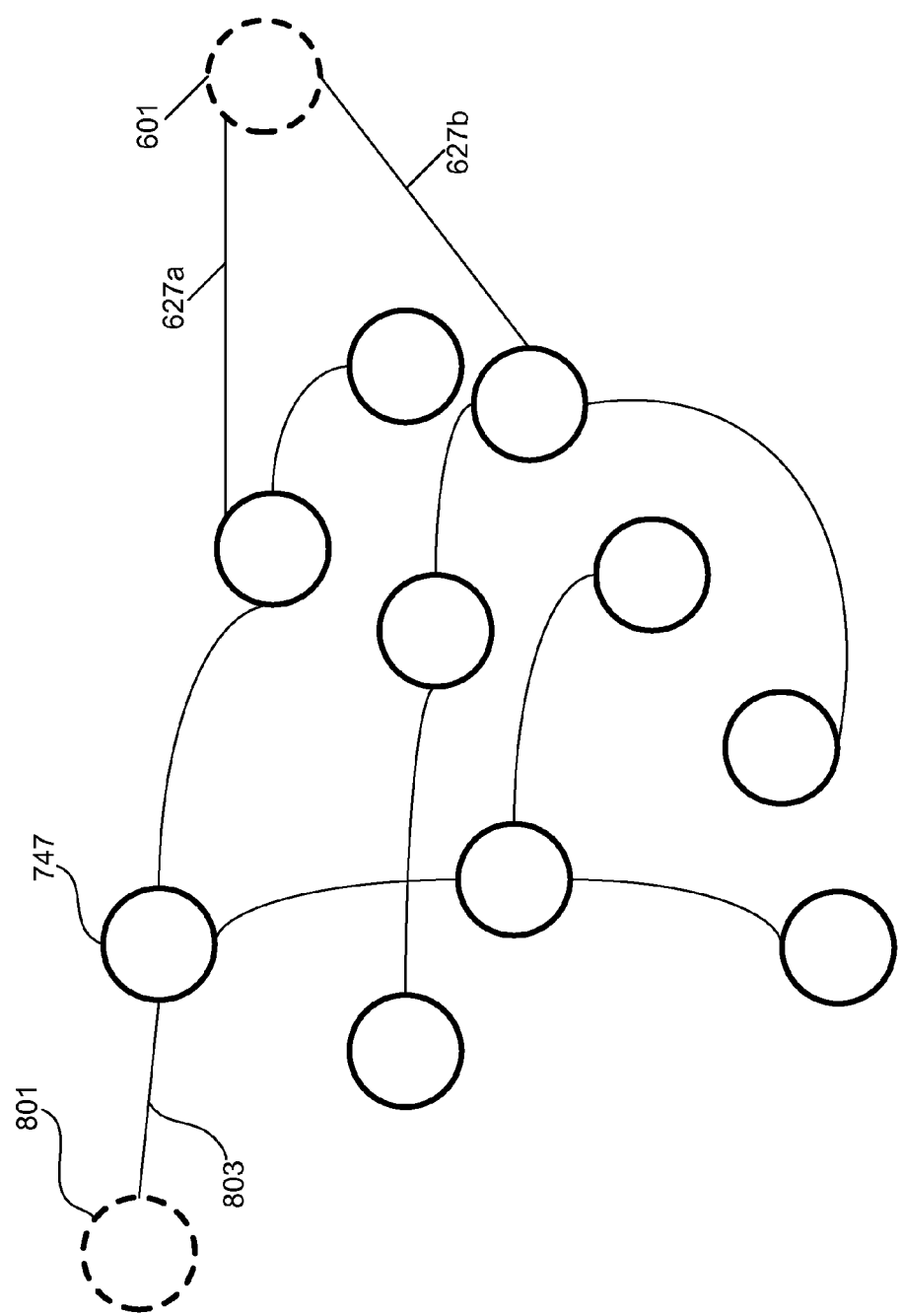
FIG. 8 shows the addition of a second user as another ghost node with a ghost edge to the social graph.

FIG. 8 shows a ghost node 801 for a second user 801 being added to graph 501. Node 801 is shown in broken lines. This second user has a single connection through a ghost edge 803 to node 747. The second user is able to see the connections in the curated system, but will not be able to traverse through a ghost edge or ghost node, or to see information on any other ghost nodes or ghost edges. In particular, node 601 and edge 627a and 627b will not be visible or accessible to the second user.

Figure 9:
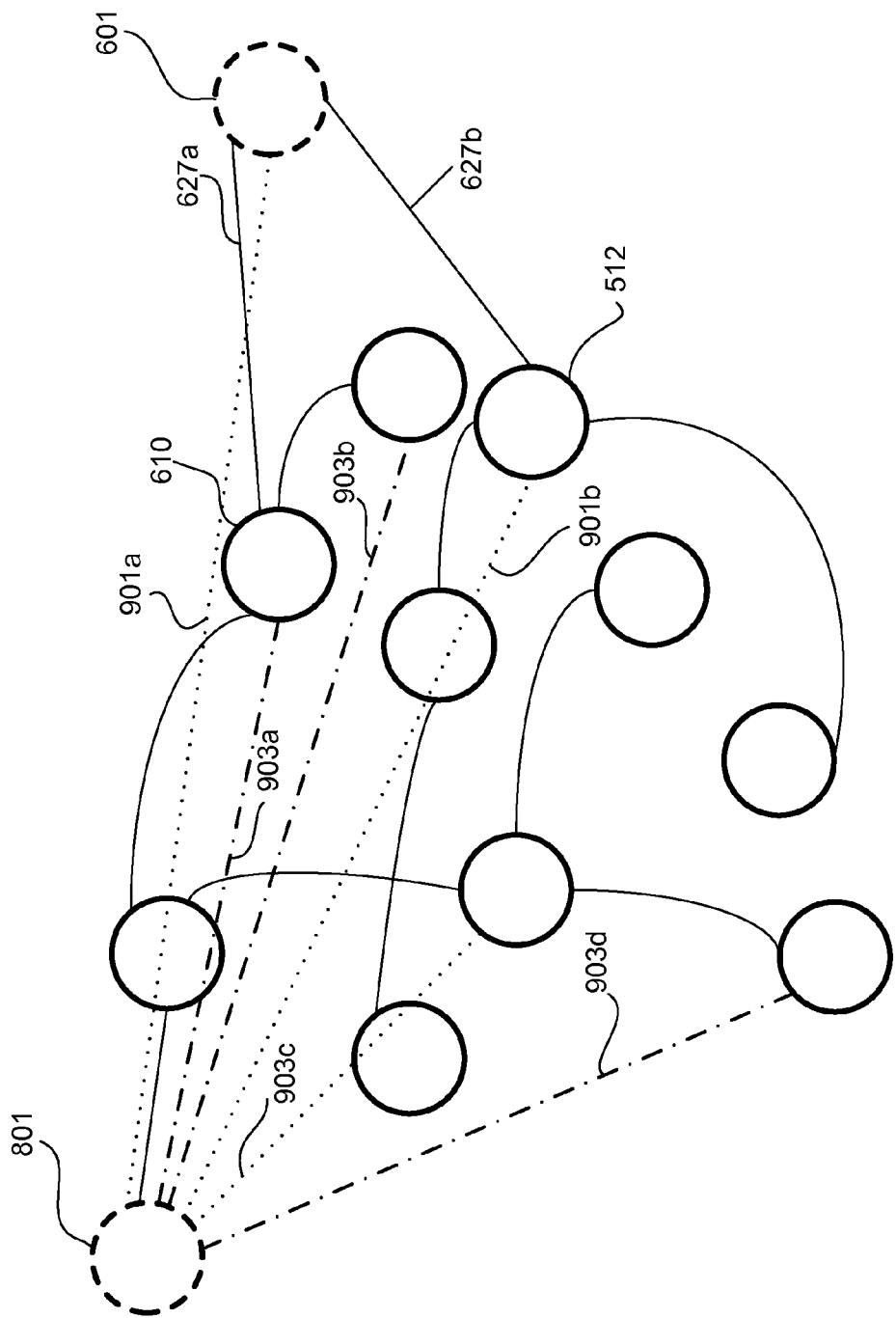
FIG. 9 shows connections the second user can make to system-provided nodes of the social nodes, and the first user's ghost node and edges are not available to the second user.

FIG. 9 shows a connection 901a between node 601 and node 801, as well as a connection 901b from node 801 to node 512. Connections 901a and 901b are shown using a dotted line. The second user 801 is connected to various nodes that are two or more degrees of separation away from the second node 801 by edges 903a, 903b, 903c, and 903d. System provided nodes may be connected via ghost nodes and ghost edges. In this figure, nodes 610 and 512 are connected by ghost node 601.

However, in an implementation of a system of the invention, users of the system (e.g., represented by ghost node 801) will not be able to see connections between system-provided nodes (e.g., 610 and 512) that are due to ghost nodes (e.g., 601) and ghost edges (e.g., 627a and 627b) of other users.

Therefore, in the graph this figure, the second user (i.e., node 801) has no connection to system-provided node 610. To reach node 610, the two ghost edges to the first user 601 would need to be traversed, which an implementation of the system does not allow.

In other implementations, a ghost node (e.g., super ghost node) can make traversals through other ghost edges and ghost nodes to make a connection to other system-provided nodes. This can occur when two users share contacts and connections between each other. So, in this example, when first user 601 and second user 801 share connections (or part of the same entity or company), both gain additional connections (e.g., n-degree, n-step connections). For example, the second user gains a connection to node 610 through the route 901a to 627a.

In an implementation, the system can have a limit for a number of degrees (i.e., d) for displaying or considering connections. As discuss, as the number of degrees increases, the strength of the connection or relationship between two nodes diminishes. Also, processing power by the system increases as d increases since many more nodes and edges are to be considered. Therefore, the limit for the number of degrees, d, can be system defined or user defined (discussed above). For example, d can be 2, 3, 4, 5, 6, 7, 8, 9, or another integer. Then, when requested to show the list of connected nodes, the report listing will show nodes restricted to within the degrees of separation as specified by the d value.

In an implementation, the graph database of the system has nodes (representing entities) and edges (representing relationships). The entities and relationships can have any number of properties. Each property for a particular entity or relationship, also has a value. Additionally the edges are directional, so that each edge implies an incoming and an outgoing node. The relationship one node has over another is different and can have different meaning, but the one relationship is represented as one explicit fact. Nodes (or vertices) and edges also have weights (or rankings) that is determined by the type or category.

Some specific flows for determining a technique of the invention are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Figure 10:
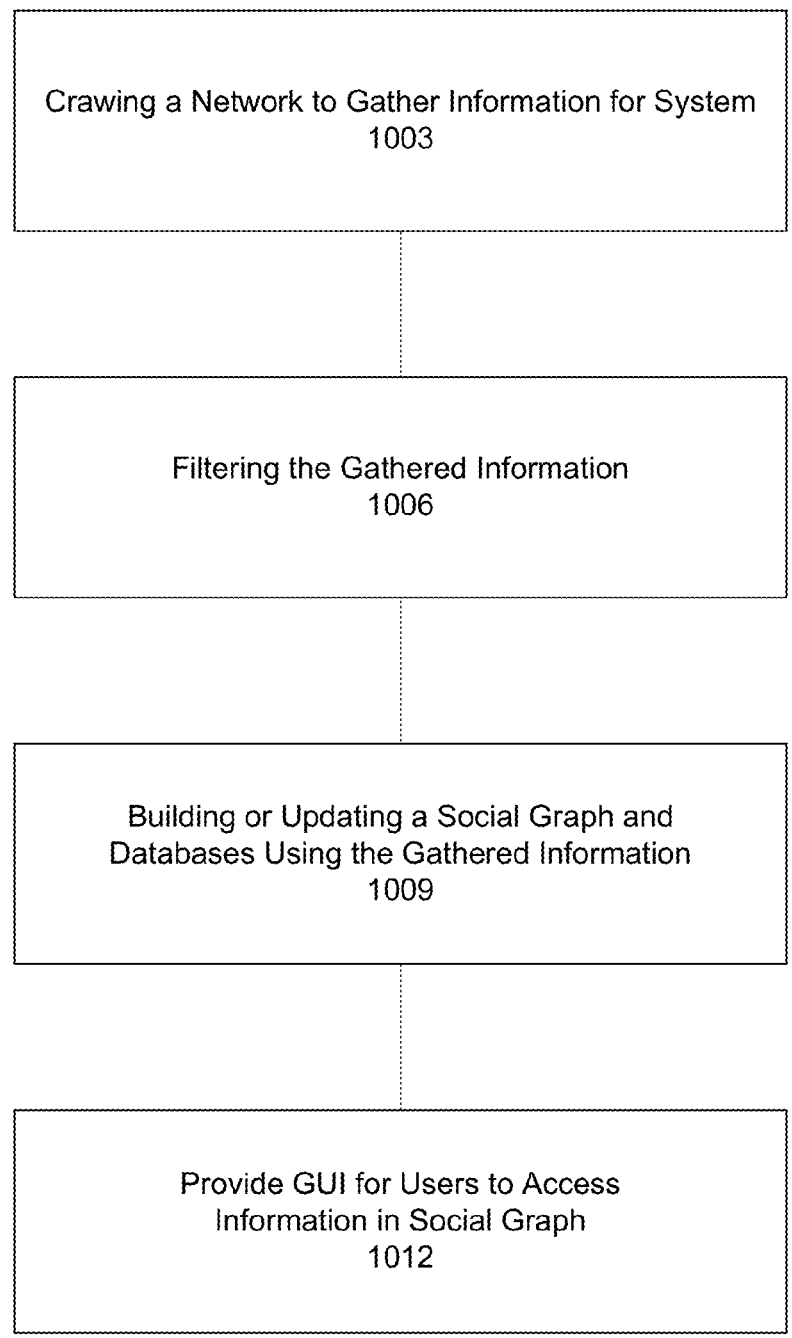
FIG. 10 shows a flow for a system of the invention.

FIG. 10 shows a flow for an implementation of a system of the invention. In a step 1003, a network (e.g., the Internet) is crawled to gather find information for the system. Crawling is an automated process through which information or data available on-line is gathered. This information can be stored on a server for further processing, such as filtering.

In a step 1006, the gathered information is filtered. Filtering can include identifying the information relevant to the system, and discarding (e.g., removing or redacting) information that is not relevant or is of low relevance to the system. For example, some information gathered from crawling may be duplicative or may already be reflected in the system. The filtered information can be stored on a server for further processing, such as for adding into the social graph. The filtering step can be optional, or may be incorporated into other steps of the flow.

In a step 1009, a social graph of the system is built, where nodes and edges created, modified, or updated, or a combination of these. As discussed, the system maintains system-provided nodes in the social graph that are representative of people or organizations. With the information gathered, existing nodes (and associated databases) can be supplemented with additional information, or information can modified or corrected. For information indicating new connections, links or edges can be added between two system-provided nodes, or new nodes can be added and connected via edges.

In a step 1012, a graphical user interface is provided through which users can access information stored in the social graph. For example, the user can access profiles (e.g., dossier database) and the social graph via a Web browser interface or a smartphone application program. The system can give screens, pages, or screens showing information on an entity (person or organization) represented by a system-provided node. Additionally, a page can give references to people (other system-provided nodes) associated with the entity by one degree of separation in the social graph structure. These would be other system-provided nodes connected by at most one system-provided edge to the entity's system-provided node. The can page also list, such as in a separate section, people who are connected by two degrees of separation.

Figure 11:
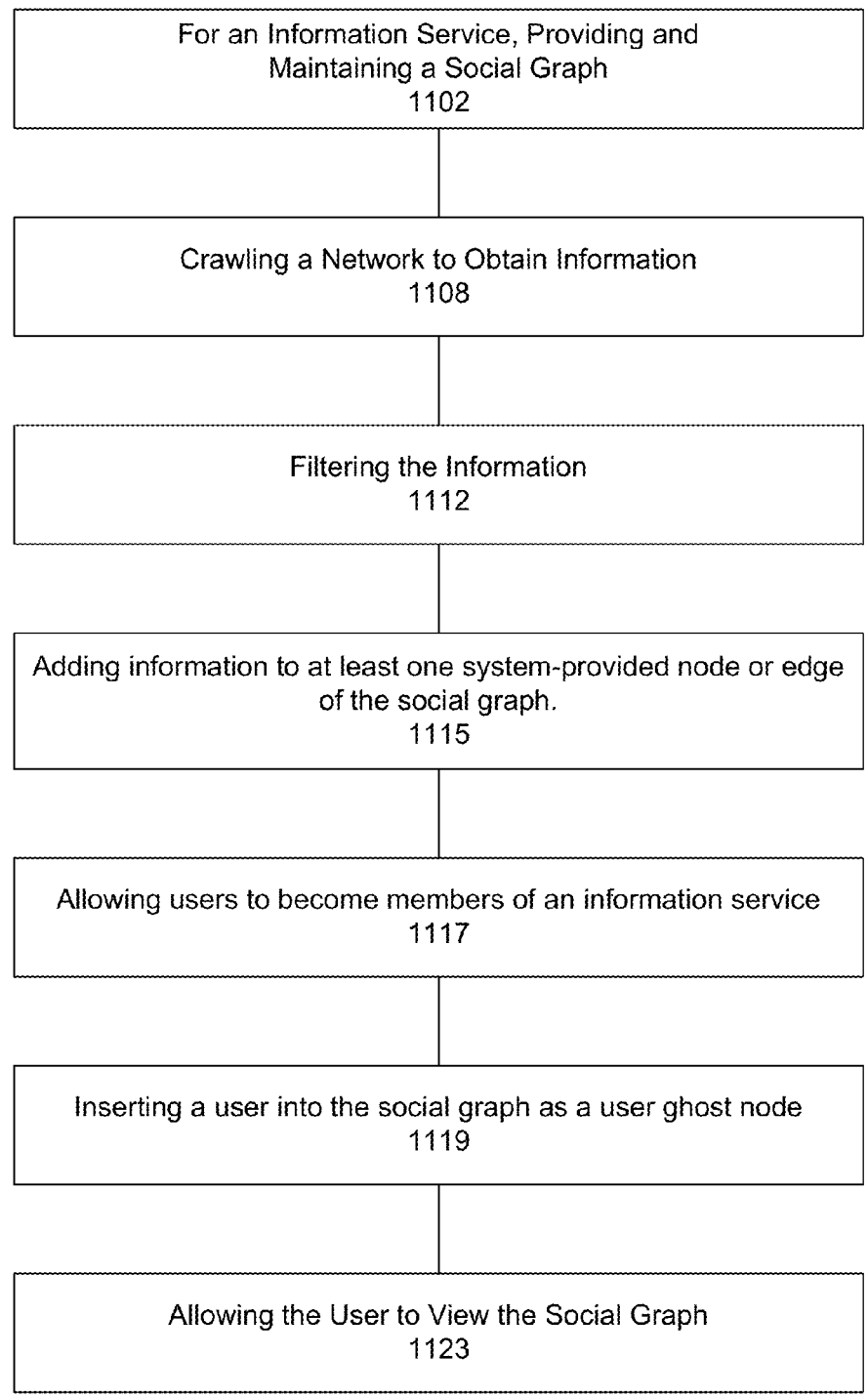
FIG. 11 shows another flow for a system of the invention.

FIG. 11 shows another flow for a system of the invention. In a step 1102, an information service maintains a social graph. In a step 1108, a network such as the Internet is crawled to obtain information. In a step 1112, this information is filtered as needed. In a step 1115, information as added into the social graph.

In a step 1117, users can become members or subscribers of the service, and then allowed access to the information available through the service including the information in the social graph. In a step 1119, the user is inserted into the social graph as a ghost node. In a step 1123, the user is allowed to view the social graph.

After become a system subscriber, the user does not need to provide any information about himself or herself to the system. However, any information the user chooses to input to the system is used to attempt to make better connections between the user's ghost node and the system-provided nodes in the social graph. Through screens of the system, the user can see connections between the user and other people (system-provided nodes) of system.

Users have anonymity in the system, so that will not able to view other users in the system. Ghost nodes and ghost edges are not used to make connections for other ghost nodes. However, an exception is that some users may be part of the same organization (such as the same investment firm), then the system will have an option to allow these users of the same organization to link through each other to build more connections.

Figure 12:
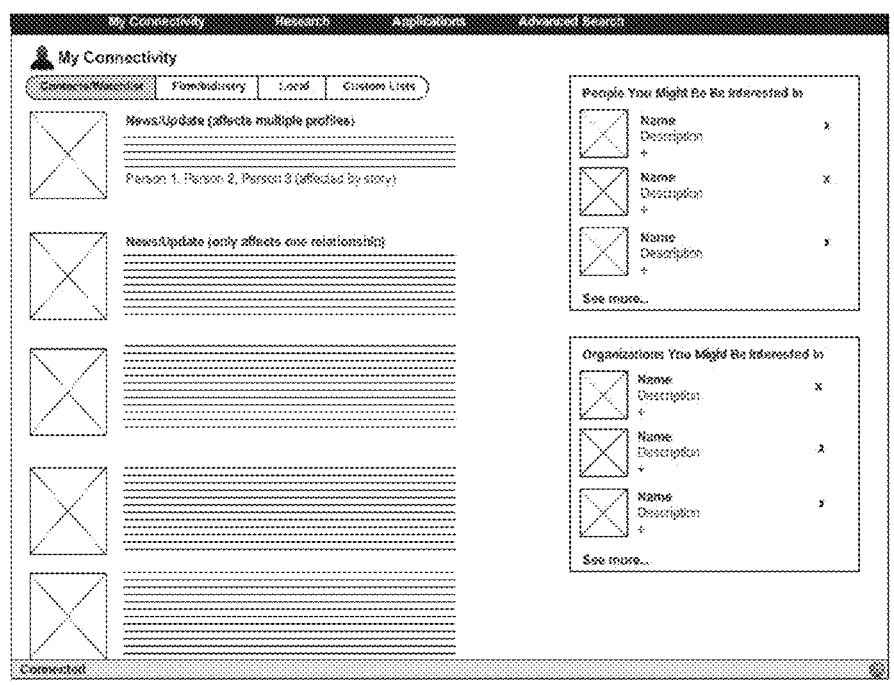
FIG. 12 shows a home page for a user, where connections between the user and entities of the system of are shown.

FIG. 12 shows a home page for a user of the system. This page shows news updates for any watches the users has set up for people (system-provided nodes) being tracked by the system and also for those people having a relationship with the users. This page has a portion that shows entities (people or organization) which the users might have an interest in through watches. Also for entities or system-provided nodes which the user has a connection (e.g., user's ghost node connects through ghost edges), a portion of the page can show a news feed for these connected people.

Figure 13:
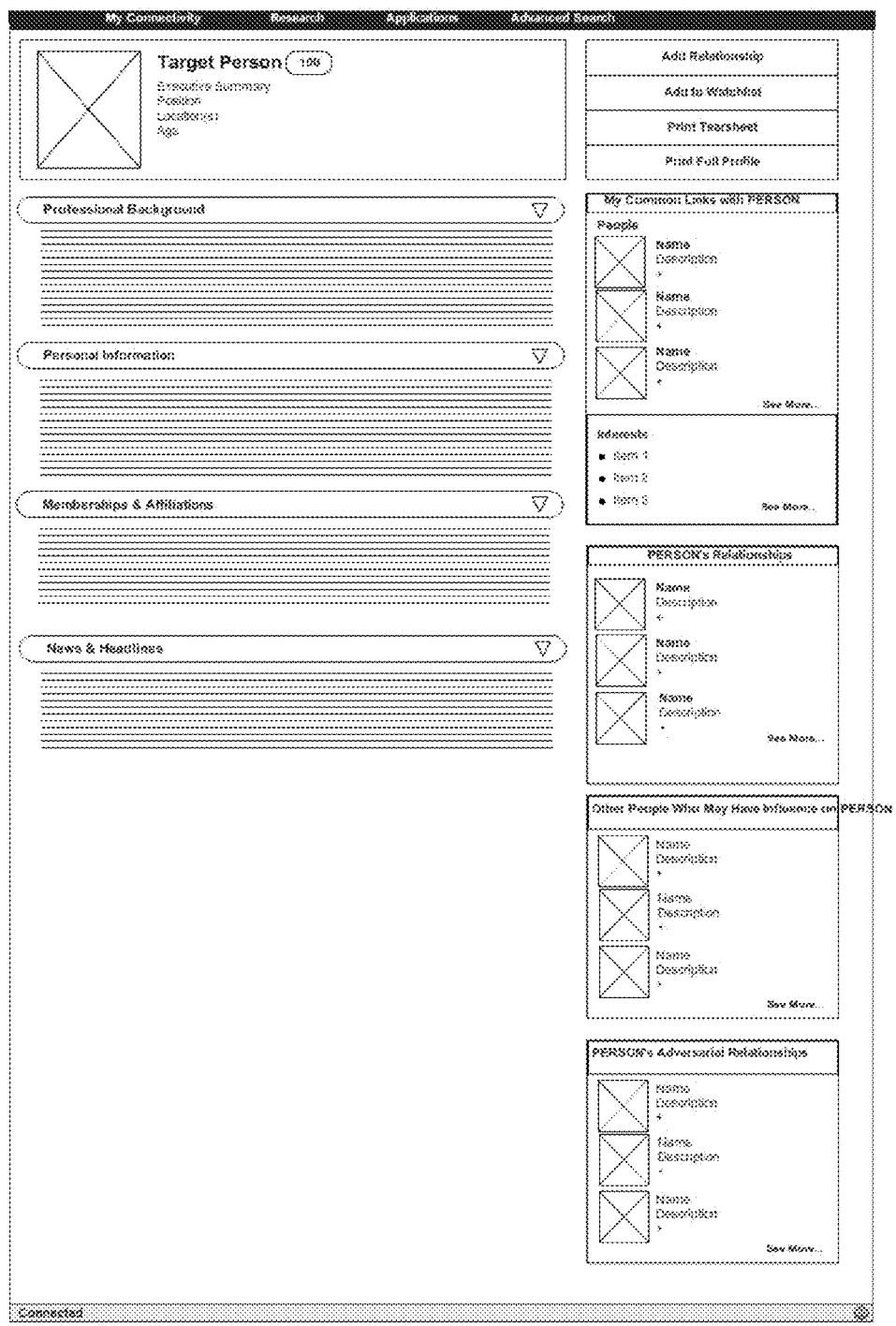
FIG. 13 shows an information page for a target person including showing people the user and target person share common links.

FIG. 13 shows an information page for person (system-provided node) of the system. This page has a portion that shows other people who have common links with this person, other people of the system being linked to this person, other people who may have an influence of the person, and adversarial relationships.

The common links are people the user (ghost node) and person (system-provided) node share in common. The user's ghost node connects to a common person through a ghost edge, and the person's system-provided node connects through a system-provided edge.

The other people of the system linked to this person (e.g., "target person") are for other system-provided nodes that have a close connection to the person. Generally, a person having fewer degrees of separation, such as a first-degree connection, have a stronger connection than other people having greater degrees of separation. In an implementation, this section of the page can include people having a first-degree connection.

Other people who may have an influence of the person lists people who are determined to be influential on the target person. The system has analytics that can calculate influence for each system-provided node. Those nodes having high influence ratings on this target person are listed in this section of the page.

Adversarial relationships lists people who might be adverse to the target person. This can be gathered information including people in lawsuits with the target person, people at rival companies, and other people with adverse interests.

Figure 14:
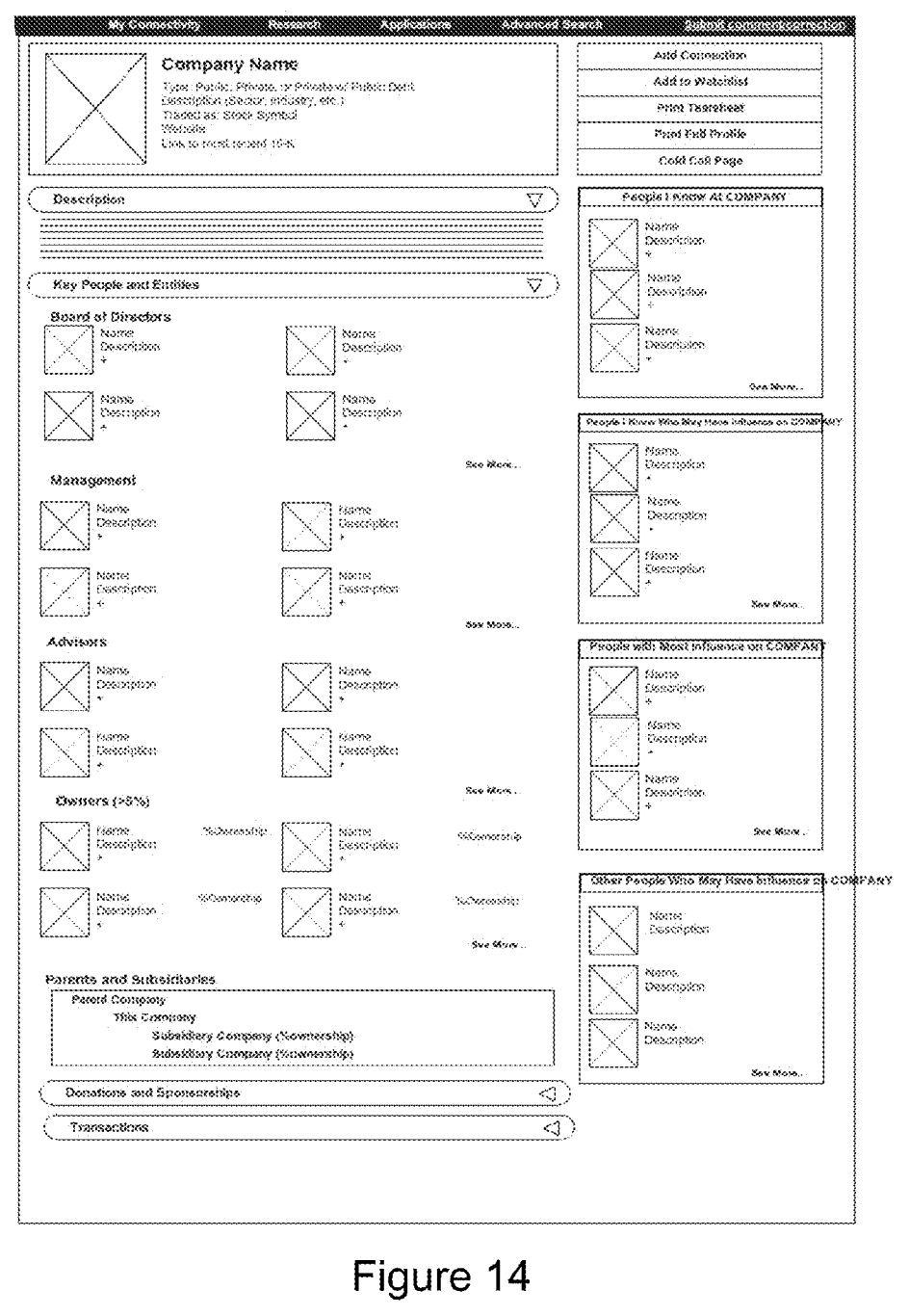

FIG. 14 shows an information page for an organization (e.g., company) of the system. This page is similar to the information page for a person described above, but the information is for an organization rather than a person. The organization is also implemented as a system-provided node in the system.

The page shows for the organization people the user knows at the organization, people the user knows who may have influence on the company (e.g., board or directors, founders, children of founders, and so forth), people with most influence on the company (e.g., CEO, or members of the board of directors), and people who may have influence on the company. This page can be useful for a user who does not have a direct connection to the company who wants to make a connection.

There are a variety of applications to a system of the invention. These can be add-on applications that leverage the system's database and social graph infrastructure. For example, one application is a vicinity search, so that a user can find people who share interests or goals ed in a particular geographical region. The vicinity search can be used to find others who would like to share contacts for a mutually beneficial business purpose. Another application is a cold call application which would identify commonalities between a person and others people with whom the person wants to have an introduction, or commonalities between a person who a user wanted to make an introduction to an organization.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:

providing a system accessible over a network to users, wherein the system includes a social graph;

providing in the social graph a first type of node, a user ghost user ghost node, and a first type of edge, a user ghost edge;

providing in the social graph a second type of node, a system-provided node, and a second type of edge, a system-provided edge;

using at least one electronic processor, maintaining the social graph comprising:

allowing a plurality of system-provided nodes of the social graph to be directly coupled to other system-provided nodes by system-provided edges, wherein system-provided nodes and system-provided edges include information gathered by the system;

allowing a plurality of user ghost nodes of the social graph to be directly coupled to system-provided nodes by user ghost edges, wherein user ghost edges include information specified by users of the system;

disallowing user ghost nodes from being directly coupled to other user ghost nodes or to system-provided nodes using system-provided edges; and disallowing system-provided nodes from being directly coupled to other system-provided nodes using user ghost edges;

crawling a network of unstructured information data sources to obtain first information;

filtering the first information to obtain second information;

storing the second information on a server;

creating a first system-provided node in the social graph using the second information;

coupling the first system-provided node to a second system-provided node in the social graph using a first system-provided edge, wherein the first system-provided edge specifies a relationship of the first and second system-provided nodes derived from the second information, and the first and second system-provided nodes have a first degree of separation, and the second system-provided node is coupled to a third system-provided node using a second system-provided edge, and the first and third system-provided nodes have a second degree of separation;

allowing a first user to become a member of a system;

creating a first user ghost node for the first user, wherein the first user ghost node is associated with information received from the first user;

coupling the first user ghost node to the first system-provided node using a first user ghost edge based on information specified by the first user;

providing a second user that is a member of the system and comprises a second user ghost node, wherein the second user ghost node is coupled to the second system-provided node using a second user ghost edge;

providing a graphical user interface through which the first user can access third information stored in the social graph comprising a path in the social graph, wherein the second user and its second user ghost node and second user ghost edge are not visible to the first user; and when determining the path in the social graph for the first user, traversing user ghost edges of the first user, which comprises the first user ghost edge, and not traversing user ghost edges of the second user, which comprises the second user ghost edge, wherein the path for the first user includes first, second, and third system-provided nodes having first, second, and third degrees of separation, respectively, from the first user ghost node through the first user ghost edge, and does not include the second user ghost node and the second user ghost edge.

2. The method of claim 1 wherein the social graph is stored in a database stored on the server.

3. The method of claim 1 wherein the graphical user interface is provided through a Web browser executing on a client device.

4. The method of claim 1 comprising:

allowing users to input fourth information via the graphical user interface;

creating user ghost nodes and user ghost edges using the fourth information, wherein the user ghost edges couple the user ghost nodes to system-provided nodes; and through the graphical user interface, displaying connections between a first user ghost nodes through first user ghost edges to at least one system provided node.

5. The method of claim 4 wherein the first user ghost node has two degrees of separation from the first system-provided node by passing through at least one first user ghost edge and at least one system-provided edge.

6. The method of claim 1 comprising:

performing analytics on the social graph comprising ranking the system-related nodes in relation to each other, whereby the ranking indicates an influence of a first system-related node to a second system-related node.

7. The method of claim 1 comprising:

updating the social graph by using the second information to supplement information associated with an existing system-provided node.

8. A method comprising:

providing a system accessible over a network to users, wherein the system includes a social graph structure;

providing in the social graph structure a first type of node, a user-provided node, and a first type of edge, a user-provided edge;

providing in the social graph structure a second type of node, a system-provided node, and a second type of edge, a system-provided edge;

allowing a plurality of system-provided nodes of the social graph structure to be directly coupled to other system-provided nodes by system-provided edges, wherein system-provided nodes and system-provided edges include information gathered by the system;

allowing a plurality of user-provided nodes of the social graph structure to be directly coupled to system-provided nodes by user-provided edges, wherein user-provided edges include information specified by users of the system;

disallowing user-provided nodes from being directly coupled to other user-provided nodes or to system-provided nodes using system-provided edges;

disallowing system-provided nodes from being directly coupled to other system-provided nodes using user-provided edges;

crawling a network of data sources to obtain information;

organizing at least a portion of the information in the social graph structure comprising system-provided nodes and system-provided edges interconnecting the nodes, wherein each node comprises information on a person or organization wherein the organizing at least a portion of the information further comprises:

based on the at least a portion of the information, determining first and second system-provided nodes representing entities identified in the at least a portion of the information, wherein the second system-provided node is directly coupled to a third system-provided node;

coupling the first and second system-provided nodes in the social graph structure via a first system-provided edge, wherein the first system-provided node is coupled to the third system-provided node by a second degree of separation;

providing a user interface through which users can access information on people or organizations stored in the social graph structure;

allowing a first user to include themselves as a first user-provided node in the social graph structure;

creating a first user-provided node for the first user, wherein the first user-provided node is associated with information received from the first user;

coupling the first user-provided node to the first system-provided node using a first user-provided edge based on information specified by the first user;

providing a second user that is a member of the system and comprises a second user-provided node wherein the second user-provided node is coupled to the second system-provided node using a second user-provided edge; and providing a first user screen where the first user can view information stored in the social graph structure comprising a path of nodes and edges, wherein the second user and its second user-provided node and second user-provided edge are not visible to the first user;

when determining the path in the social graph structure for the first user, the system traverses user-provided edges directly coupled to the first user, which comprises the first user-provided edge, while ignoring user-provided edges directly coupled to the second user, which comprises the second user-provided edge, and the path comprises first, second, and third system-provided nodes having first, second, and third degrees of separation, respectively, from the first user-provided node through the first user-provided edge.

9. The method of claim 8 comprising:

providing a second user screen where the first user can view references to second-degree connected people associated with the first person by two degrees of separation in the social graph structure, wherein the second-degree connected people are stored at system-provided nodes connected through at most two system-provided edges to the selected system-provided node.

10. The method of claim 9 wherein the organizing at least a portion of the information in a social graph structure comprises:

storing a first piece of the information in a third system-provided node of the social graph structure;

storing a second piece of the information in a fourth system-provided node; and using a third piece of the information to form a third system-provided edge to connect the third and fourth system-provided nodes.

11. A method comprising:

providing a system accessible over a network to users, wherein the system includes a social graph;

providing in the social graph a first type of node, a user ghost node, and a first type of edge, a user ghost edge;

providing in the social graph a second type of node, a system-provided node, and a second type of edge, a system-provided edge;

allowing a plurality of system-provided nodes of the social graph to be directly coupled to other system-provided nodes by system-provided edges, wherein system-provided nodes and system-provided edges include information gathered by the system;

allowing a plurality of user ghost nodes of the social graph to be directly coupled to system-provided nodes by user ghost edges, wherein user ghost edges include information specified by users of the system;

disallowing user ghost nodes from being directly coupled to other user ghost nodes or to system-provided nodes using system-provided edges;

disallowing system-provided nodes from being directly coupled to other system-provided nodes using user ghost edges;

receiving first information obtained through a network;

filtering the first information to identify second information relevant to first and second system-provided nodes of the social graph;

adding at least a portion of the second information to the social graph comprising:

coupling the first system-provided node to the second system-provided node in the social graph using a first system-provided edge, wherein the first system-provided edge specifies a relationship of the first and second system-provided nodes derived from the second information, and the first and second system-provided nodes have a first degree of separation, and the second system-provided node is coupled to a third system-provided node using a second system-provided edge, and the first and third system-provided nodes have a second degree of separation;

by one or more computers, allowing users to become members of the system comprising:

allowing first and second users to become members of the system;

creating a first user ghost node for the first user, wherein the first user ghost node is associated with information received from the first user;

coupling the first user ghost node to the first system-provided node using a first ghost provided edge based on information specified by the first user;

creating a second user ghost node for the second user, wherein the second user ghost node is associated with information received from the second user; and coupling the second user ghost node to the first system-provided node using a second user ghost edge based on information specified by the second user; and allowing the first user to view information on a first screen including the first system-provided node and other system-provided nodes of the social graph, but not the second user ghost node, and the allowing the first user to view information comprising determining a relationship between the first user and an entity represented by the third system-provided node by traversing user ghost edges of the first user in the social graph, which comprises the first user ghost edge, and not traversing user ghost edges of the second user, which comprises the second user ghost edge, wherein the path for the first user includes first, second, and third system-provided nodes having first, second, and third degrees of separation, respectively, from the first user ghost node through the first user ghost edge, and does not include the second user ghost node and the second user ghost edge.

12. The method of claim 11 comprising:

after a third user becomes a member, inserting the third user into the social graph as a third user ghost node and coupling the third user ghost node to the first system-provided node through a third user ghost edge; and allowing the third user to access the first system-provided node and other system-provided nodes of the social graph, but not allowing the third user view the first user ghost node.

13. The method of claim 12 comprising:

not allowing the first user to view the third user ghost node.

14. The method of claim 11 comprising:

after a first user becomes a member, receiving first input from the first user; and based on the first input, determining a connection to the first system provided node through the first user ghost edge.

15. The method of claim 14 comprising:

after a first user becomes a member, receiving second input from the first user; and based on the second input, determining a connection between the first user ghost node to a fourth system-provided node through a third user ghost edge, wherein the first system-provided node is not directly connected to the fourth system-provided node through a system-provided edge.

16. The method of claim 11 comprising:

based on the second information, adding a third system-provided edge to the first system-provided node comprising the second information.

17. The method of claim 11 comprising:

displaying the first user a list of second system-provided nodes that are at a first degree of separation from the first system-provided node.

18. The method of claim 11 comprising:

displaying the first user a list of second system-provided nodes that are within a second degree of separation from the first system-provided node.

19. The method of claim 11 comprising:

permitting the first user to indicate a number of degrees of separation greater than one for displaying system-provided nodes connected to the first system-provided node.

20. The method of claim 11 wherein the network is the Internet and sources of the first information obtained from the Internet are unstructured.

* * * * *